United States Patent

Göbl

(10) Patent No.: US 6,202,701 B1
(45) Date of Patent: Mar. 20, 2001

(54) HOSE FOR CONVEYING FREE-FLOWING MATERIAL

(75) Inventor: Otmar Göbl, Altach (AT)

(73) Assignee: Wagner International AG, Altstatten (CH)

( * ) Notice: Subject to any disclaimer, the term of this patent is extended or adjusted under 35 U.S.C. 154(b) by 0 days.

(21) Appl. No.: 09/359,480

(22) Filed: Jul. 22, 1999

(30) Foreign Application Priority Data

Jul. 24, 1998 (DE) .............................. 198 33 493

(51) Int. Cl.[7] ....................................... F16L 11/12
(52) U.S. Cl. ............... 138/127; 138/133; 138/152; 138/170
(58) Field of Search .................. 138/125, 127, 138/133, 152, 170, 104

(56) References Cited

U.S. PATENT DOCUMENTS

| | | | | |
|---|---|---|---|---|
| 3,201,507 | * | 8/1965 | Johnsen ................................. | 138/122 |
| 3,555,170 | * | 1/1971 | Petzetakis et al. ................... | 138/103 |
| 4,312,383 | * | 1/1982 | Kleykamp ............................. | 138/121 |
| 4,394,705 | * | 7/1983 | Blachman ............................. | 138/125 |
| 5,017,873 | * | 5/1991 | Rippingale et al. ................... | 138/104 |
| 5,036,210 | * | 7/1991 | Goodman ............................. | 138/104 |
| 5,142,782 | * | 9/1992 | Martucci .............................. | 138/125 |
| 5,170,011 | * | 12/1992 | Martucci .............................. | 138/137 |
| 5,730,189 | * | 3/1998 | Randlett et al. ..................... | 138/142 |

FOREIGN PATENT DOCUMENTS

| | | |
|---|---|---|
| 75 34 723 | 3/1976 | (DE) . |
| 79 34 101 | 5/1981 | (DE) . |
| 31 45 702 | 5/1983 | (DE) . |
| 32 02 854 | 8/1983 | (DE) . |

* cited by examiner

Primary Examiner—James Hook
(74) Attorney, Agent, or Firm—Faegre & Benson LLP

(57) ABSTRACT

A hose for conveying free-flowing materials, such as coating powder made of an electrically non-conductive or poor conductive material is characterized in that a wall member of an electrically conductive material is installed into the wall of the hose, said wall member extending radially across the cross section of the wall and axially across the length of the hose, and being grounded towards the outside and having an approximately sector-shaped cross section as in a welding seam in a manner so that on the one hand a favorable discharge of undesired electric charges is achieved and on the other hand a caking at the inner wall of the hose is virtually excluded.

17 Claims, 1 Drawing Sheet

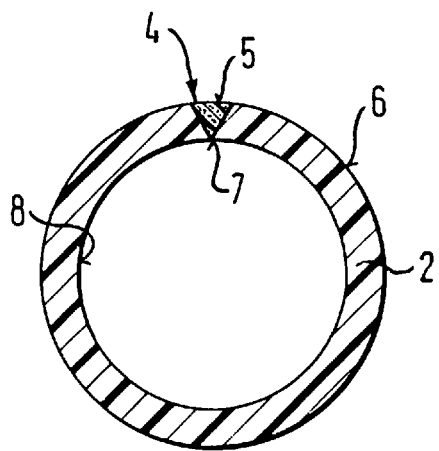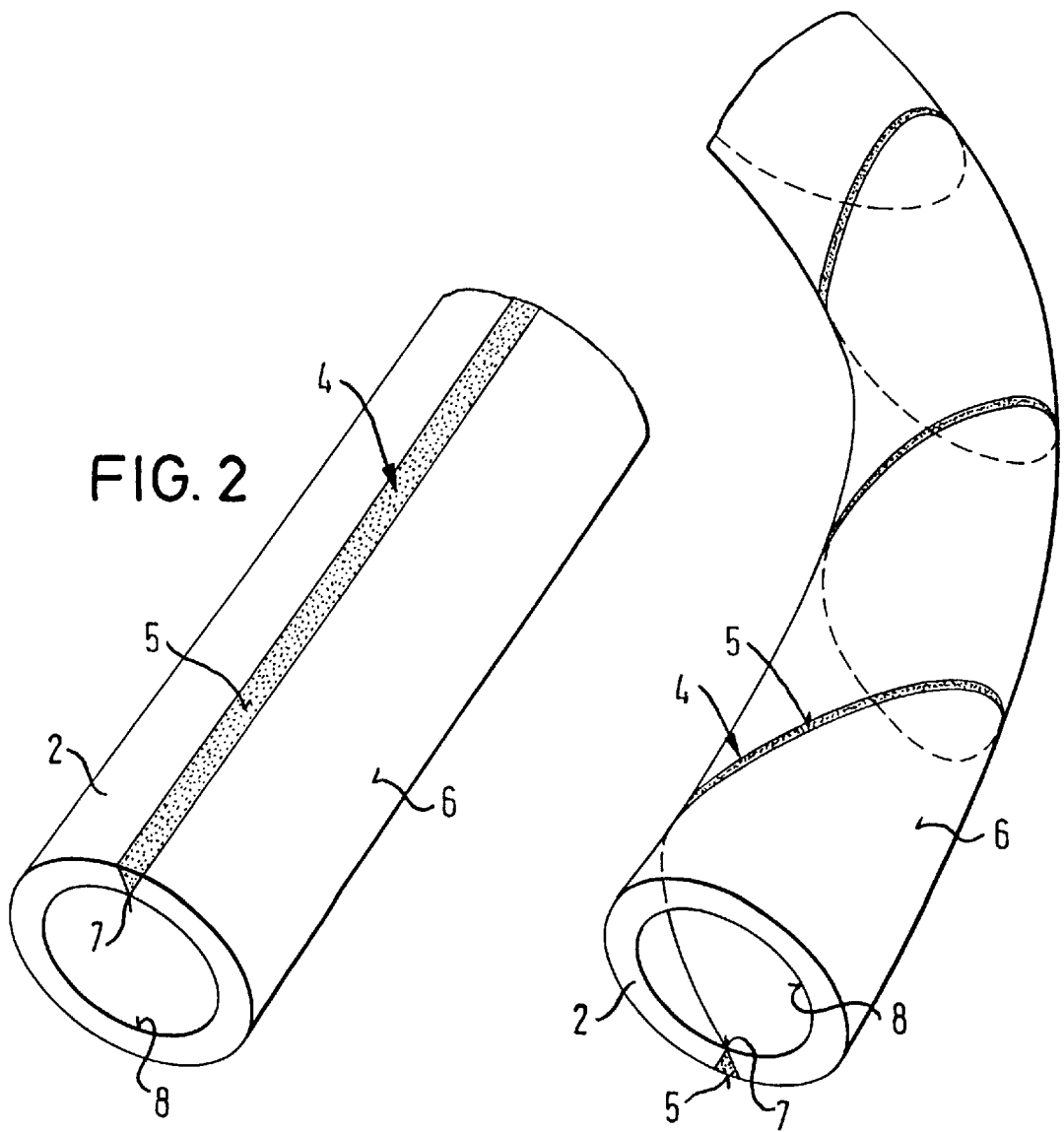

HOSE FOR CONVEYING FREE-FLOWING MATERIAL

The present inventions relates to a hose for conveying free-flowing materials, in particular coating powder, consisting of an electrically non-conductive or poor conductive material.

Coating powders are usually conveyed pneumatically through plastic hoses from a reservoir to a spray gun. Friction of the powder particles at the hose inner wall may generate strong electrostatic charges on the inner side of the hose. Corresponding mirror charges are formed on the outer side of the hose, said mirror charges may at times become so strong that they cause disruptive discharges through the hose wall and/or discharges from the outer side of the hose to grounded parts of the coating assembly.

To avoid these undesired, sometimes dangerous effects, hoses made of an electrically conductive material were used for conveying coating powders. Hoses of this kind do, however, have the disadvantage that they have the tendency to form powder cake or sinterings on the inner wall of the hose, which in the worst case can fully obstruct the hose.

A hose of the described kind having an electrically non-conductive or poor conductive hose wall is known, integrated into which is a grounded wall member made of an electrically conductive material extending radially throughout the cross section of the wall (DE 31 45 702 A1, DE 12 76 207 U1). The object of the invention is to provide a hose of the above-mentioned kind, which does not generate electric discharges and which at the same time avoids the caking or sintering of powder material at the inner hose wall.

To accomplish this object a hose according to the present invention includes an electrically conductive wall member which is grounded on the outside and extends radially throughout the cross section of the hose, said wall member having a cross section with a large circumferential dimension at the outer surface of the hose wall, and a significantly smaller circumferential dimension at the inner surface of the hose wall.

It is especially advantageous when the wall member is formed sector-shaped, preferably triangularly like those found in the cross-section of a welding seam, wherein the apex of the triangle approximately coincides with the inner surface of the hose, and the base of the triangle approximately coincides with the outer surface of the hose.

In a hose according to the invention a favorable discharge of undesired charges is achieved towards the outside due to the friction of the free-flowing materials owing to the relatively large conductive surface on the outer side of the hose. Caking and sintering of the free-flowing material at the inner hose wall is practically excluded due to the minimized surface of the electrically conductive material on the inner surface of the hose.

In order to further reduce the risk of cakings or sinterings of the conveyed materials at the inner surface of the hose, the wall portion may be shaped preferably wedge-like as seen in its longitudinal extension, i.e. it may become progressively smaller in the longitudinal direction of the hose.

The electrically conductive wall portion preferably consists of a metal wire or a metal strand. Alternatively, the conductive wall portion can also consist of a plastic material that is made conductive by the addition of carbon. The electrically non-conductive material of the hose is, as known per se, a plastic material that is electrically non-conductive, preferably polyvinylchloride or polyurethane.

A hose according to the invention reliably conveys electrostatic charges generated in the hose by friction of the conveyed substances against the inner wall of the hose towards the ground without producing obstructive cakings or sinterings of the material on the inner side of the hose.

The invention will now be described with further details with reference to the accompanying drawings, in which:

FIG. 1 is a cross-sectional view of a hose according to the invention;

FIGS. 2 and 3 are perspective partial views of two different embodiments of hoses according to the invention.

In the sectional view according to FIG. 1, the cross section 2 of a hose made of a non-conductive material, e.g. polyvinylchloride, is penetrated through the entire wall thickness of the hose from the radial outside to the radial inside at a particular circumferential location by a wall member 4 made of an electrically conductive material, such as a plastic material to which carbon may have been added. The wall member 4 takes a small fraction only of the circumference of the cross section of the hose. As shown, the wall member 4 is preferably sector-shaped similar to the shape of a welding seam, so that at the outer side of the hose 6 offers a greater surface for discharging undesired charges towards the outside whereas at the inner wall 8 of the hose only a minimum surface is provided in order to reduce powder caking or sintering.

More in detail, the wall member 4 has approximately the cross section of an isosceles triangle, the base 5 of which substantially coincides with the outer side 6 of the hose at 5, whereas the apex of the triangle coincides with the inner side 8 of the hose. Thus, the outer surface 5 of the wall member is maximized to achieve a greater discharge face for the electric charge and the inner surface 7 is reduced to substantially a line (appearing as a point in FIG. 1) and therefore minimized to achieve the smallest possible powder caking surface.

To achieve the above-mentioned effects, the wall member may also have a different cross section, e.g. a T-shaped cross section (not shown in the drawings), wherein the T crossbar substantially coincides with the outer side 5 of the hose and the lower end of the T standbar coincides with the inner side of the tubular hose.

The wall member 4 preferably extends over the entire length of the hose according to FIG. 2 in the direction of a hose envelope line, i.e. parallel to the hose length axis, and according to the alternative embodiment of FIG. 3 along a helical line with large pitch. In both embodiments of FIG. 2 and FIG. 3, the wall member is designated for simplicity's sake, as in FIG. 1, by reference numeral 4.

FIG. 2 additionally shows the particularity that the electrically conductive wall member 4 is formed wedge-shaped in the direction of its longitudinal extension, i.e. wall member 4 becomes ever smaller in the longitudinal direction. This feature, which may of course also be provided in the embodiment according to FIG. 3, further reduces the risk of caking or sintering of powder at the inner wall surface of the hose.

Instead of an electrically conductive plastic material, the wall member may also be made of a metal wire or a bundle of a plurality of metal strands twisted in a rope-like manner.

The features disclosed in the above description, in the claims and in the drawings can be meaningful either individually or in any combination for the realization of the invention in its different embodiments.

What is claimed is:

1. A hose for conveying free-flowing materials comprising a hose wall of an electrically non-conductive or poor conductive material, wherein a wall member (4) of electrically conductive material integrated into the hose wall (2), said wall member having an outside and an inside and extending radially across a cross section of the hose wall and wherein the wall member is grounded on the outside and has a cross section with a circumferential dimension significantly larger at the outside than at the inside.

2. A hose as claimed in claim 1 wherein the cross section of the wall member (4) is shaped substantially as a sector of a circle.

3. A hose as claimed in claim 2 wherein the hose has an outside surface and the cross section of the wall member (4) is shaped substantially as a triangle, the apex of the triangle substantially being located at the inner surface of the hose, and a base of the triangle coinciding substantially with the outer surface of the hose.

4. A hose as claimed in claim 1, characterized in that the wall member (4) extends over a length of the hose.

5. A hose as claimed in claim 4 wherein the wall member (4) extends in parallel to a longitudinal axis of the hose.

6. A hose a claimed in claim 4 wherein the wall member (4) extends helically around a longitudinal axis of the hose.

7. A hose as claimed in claim 1 wherein the wall member (4) is shaped wedge-like in a longitudinal direction.

8. A hose as claimed in claim 1 wherein the hose, except for the wall member (4), is made of an electrically non-conductive material.

9. A hose as claimed in claim 8 wherein the wall member (4) is made of a metal strand.

10. A hose as claimed in claim 8 wherein the wall member (4) is made of a plastic material that is made conductive by addition of carbon.

11. A hose as claimed in claim 8 wherein the electrically non-conductive material is a plastic material.

12. A hose as claimed in claim 11 wherein the plastic material is polyvinylchloride.

13. A hose as claimed in claim 11 wherein the plastic material is polyurethane.

14. A hose as claimed in claim 1 wherein the wall member (4) is made of metal.

15. A hose as claimed in claim 14 wherein the wall member further comprises a wire.

16. A hose as claimed in claim 1 wherein the wall member (4) is made of a plastic material that is made conductive by addition of carbon.

17. A hose as claimed in claim 1 wherein the free flowing materials include a coating powder.

* * * * *